US009440582B2

(12) United States Patent
Bayersdorfer et al.

(10) Patent No.: US 9,440,582 B2
(45) Date of Patent: Sep. 13, 2016

(54) FIBER-OPTIC CABLE WITH REINFORCEMENT FOR LINING A GROOVE

(71) Applicant: Lisa Dräxlmaier GmbH, Vilsbiburg (DE)

(72) Inventors: Bernhard Bayersdorfer, Baierbach (DE); Rudolf Aichner, Kirchberg (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 126 days.

(21) Appl. No.: 14/276,403

(22) Filed: May 13, 2014

(65) Prior Publication Data

US 2014/0338156 A1 Nov. 20, 2014

(30) Foreign Application Priority Data

May 14, 2013 (DE) ........................ 10 2013 208 832

(51) Int. Cl.

| | |
|---|---|
| ***B60Q 3/00*** | (2006.01) |
| ***G02B 6/00*** | (2006.01) |
| ***F21V 8/00*** | (2006.01) |
| ***B60R 11/00*** | (2006.01) |
| ***B60Q 3/02*** | (2006.01) |

(52) U.S. Cl.

CPC ............... *B60Q 3/002* (2013.01); *B60Q 3/004* (2013.01); *B60Q 3/0203* (2013.01); *B60Q 3/0289* (2013.01); *B60R 11/00* (2013.01); *G02B 6/001* (2013.01); *F21V 2200/10* (2015.01); *F21V 2200/13* (2015.01); *F21V 2200/17* (2015.01); *G02B 6/0008* (2013.01); *Y10T 24/33* (2015.01); *Y10T 29/49826* (2015.01)

(58) Field of Classification Search

None

See application file for complete search history.

(56) References Cited

U.S. PATENT DOCUMENTS

| | | | | |
|---|---|---|---|---|
| 5,680,496 A * | 10/1997 | Burkitt, III | ............ | G02B 6/001 362/36 |
| 6,152,586 A * | 11/2000 | Dealey, Jr. | ............ | B60Q 3/004 362/459 |
| 6,402,353 B2 * | 6/2002 | Dealey, Jr. | ............ | B60Q 3/004 362/223 |
| 6,450,678 B1 * | 9/2002 | Bayersdorfer | ......... | B60Q 3/004 362/488 |
| 2005/0213342 A1 * | 9/2005 | Tufte | ...................... | G09F 13/20 362/551 |
| 2010/0296302 A1 * | 11/2010 | Welch, Sr. | ............ | B60Q 3/004 362/471 |
| 2014/0226353 A1 * | 8/2014 | Sohizad | ................ | G02B 6/001 362/511 |

FOREIGN PATENT DOCUMENTS

| | | | | |
|---|---|---|---|---|
| DE | 19724486 A1 | 12/1998 | | |
| DE | 19940849 A1 | 3/2001 | | |
| DE | 102009039556 | 3/2010 | | |
| DE | WO 2012022791 A1 * | 2/2012 | ............ | B60Q 3/004 |
| JP | WO 2007047304 A1 * | 4/2007 | ............ | B60Q 3/004 |
| WO | WO 2004/076518 A1 | 9/2004 | | |

* cited by examiner

*Primary Examiner* — Michelle R Connelly

(74) *Attorney, Agent, or Firm* — Finnegan, Henderson, Farabow, Garrett & Dunner LLP

(57) ABSTRACT

A retaining device for retaining a fiber-optic cable. The retaining device includes an elongated hollow part configured to receive the fiber-optic cable and a retaining element extending away from the hollow part, when viewed in a cross-section. The retaining element is configured to be inserted into a groove.

14 Claims, 2 Drawing Sheets

10´ 20´ 21´ 30´ 22´ 40´

21 10 22 27 30 31 50 32 35

FIBER-OPTIC CABLE WITH REINFORCEMENT FOR LINING A GROOVE

CROSS-REFERENCE TO RELATED APPLICATIONS

This application is based upon and claims the benefit of prior German Application No. 10 2013 208 832.9, filed on May 14, 2013, the entire contents of which are incorporated herein by reference.

FIELD OF TECHNOLOGY

The disclosure relates to a retaining device for retaining a fiber-optic cable to be used especially in an automotive interior, and a method for mounting such a retaining device.

BACKGROUND

Fiber-optic cables can be used to illuminate automotive interiors. The fiber-optic cables serve to generate immediately visible light lines, as well as indirect lighting, also referred to as ambient lighting.

As fiber-optic cables, PMMA fibers, with a diameter of, e.g., about 0.2-3.0 mm, are generally used. In order to install such a cable in an automotive interior, the cable is enclosed by a fabric strip. The fabric strip has a projecting, also referred to as a flag or retaining flag, which is sewn in between two sections of a decorative surface, e.g., between two leather sections.

The retention method described above is shown in FIG. 1. Here, a fiber-optic cable 10' is covered by a fabric 20' having a hollow part 21', into which the fiber-optic cable 10' is inserted. The fabric projection 22' is sewn into a joint between two leather layers 30' by means of a seam 40'. Basically, the fabric cover 20' is intended to protect the fiber-optic cable 10' against contact and any mechanical or chemical damage. Furthermore, the fabric cover 20' may have optical functions, e.g., acting like a cladding layer, or determining the intensity and color of the radiated light.

DE 197 24 486 A1 explains how the fiber-optic cable is retained by sewing or clamping. There, the fiber-optic cable is enclosed by either a transparent film, a woven fabric, a fiber mesh, or a one-piece plastic element.

Sewing or clamping the fiber-optic cable in the joining areas of a decorative surface represents a complex and expensive additional processing step in preparation of the lining process. Thus, interior automotive elements provided with fiber-optic cables are found only in the upper-middle and upper range, and in relatively small number of vehicles.

SUMMARY

One object of the disclosure is to simplify the mounting of fiber-optic cables, in particular in automotive interiors.

This object is achieved with a retaining device, a fiber-optic cable device, and a method for mounting a fiber-optic cable according to a disclosed embodiment.

The retaining device according to the disclosure is intended to retain a fiber-optic cable by partially or completely inserting the retaining device into a groove of an automotive interior. The retaining device may already contain a fiber-optic cable, when being inserted into the groove. Alternatively, the fiber-optic cable may be inserted after the retaining device is mounted. In some embodiments, the retaining device has a flexible receiving part with an elongated hollow part for receiving the fiber-optic cable and a projection extending away from the hollow part, when viewed in cross-section. The cross section is here to be taken perpendicularly to the longitudinal extension of the hollow part, i.e., the axis of the fiber-optic cable. The elongated hollow part encloses the fiber-optic cable, and thus serves as a cover for the fiber-optic cable. In some embodiments, the receiving part is an elongated strip of a material, e.g., fabric or plastic, wrapping around the fiber-optic cable. In some embodiments, the receiving part directly contacts the fiber-optic cable. The two ends of the material strip are joined and extend together as a projection away from the hollow part of the receiving part. The projection is also referred to as a flag.

According to a disclosed embodiment, the projection is connected to a stable retaining element, or forms a stable retaining element itself, e.g., when the receiving part is an integral part made of plastic, whereby the needed stability is obtained as a result of the plastic and the thickness of the flag. The needed stability is determined according to whether the retaining device can be inserted without bending or veering via the stable retaining element into the groove provided for this purpose. The groove may already exist and there is no need to first produce the groove by sewing or clamping the fiber-optic cable or a cover surrounding the fiber-optic cable.

Due to the reinforcement or rigidity of the projection with the retaining element, the fiber-optic cable and its cover may be inserted into the existing groove in a simple, quick, and straightforward way. The retaining element is sufficiently rigid and stable that it may be inserted completely or partially into the groove by the mounting force without bending or veering. In this way, the fiber-optic cable may be installed in an easy and simple way, which makes it possible to reduce production costs. Moreover, the weight and costs may be reduced, as there is no need for additional elements, such as sewing threads, screws, additional clamping elements, etc.

In some embodiments, the retaining element has a plastic strip for realizing the required stability in a simple and easy way and with little weight. In addition, by using plastic, one or more geometric structures may be formed on the retaining element in an especially simple way, which structures may be used for interlocking with the groove. The geometric structures may be barbed hooks, protrusions, expansions, recesses, etc., contacting walls forming the groove, and cooperating such that secure and durable retention of the fiber-optic cable is achieved.

In some embodiments, the retaining element has an adhesive side or at least a partially adhesive side in order to further improve the retention of the fiber-optic cable in the groove. Moreover, this may alternatively or additionally be achieved by the retaining element having a hook strip. In particular, if the hook strip interacts with a fabric found in the groove or a fabric forming a groove wall, durable retention is achieved in a simple way, thus reducing the weight. If the hook strip, individually or together with the projection, has sufficient rigidity for allowing the retaining device to be inserted into the groove, additional actions for reinforcing the projection are no longer required. The groove may be formed, e.g., when two different materials converge, whereby the fiber-optic cable with the reinforced flag can be inserted at the resulting joint. If one of these materials is a fabric, a hook strip consistent with embodiments of the disclosure may be suitable for durable retention.

In some embodiments, the receiving part consists partially or wholly of, e.g., extruded plastic. This plastic may be transparent or partially transparent. Thus, the elongated hollow part is made of a transparent or partially transparent plastic. As the hollow part and the projection are formed from the same plastic, the receiving and retaining element may be provided as one piece, which represents a particularly low-weight and economical realization of the disclosure.

In some embodiments, the receiving part includes a fabric forming the hollow part and the projection, whereby the projection of fabric is connected with the retaining element. Fabric strips are suitable for covering a waveguide, as they are flexible and can be easily wrapped around the waveguide. Further, a projection can be easily made from the ends of the fabric strip. Alternatively, the material for the receiving part may include another flexible material such as a transparent film, a fabric, or fiber mesh. In some embodiments, the receiving part can also be formed as an integral and at least partially flexible plastic injection-molded part by producing the hollow part and the flag in an injection molding or extrusion process.

In some embodiments, the retaining element has a thickness (dimension along the cross section of the groove) in the range of 0.5-2 mm, such as a thickness of about 1 mm. Moreover, the retaining element has a width (dimension along the depth of the groove) in the range of 5-20 mm, such as a width of 10 mm. These dimensions may be suitable for mounting the retaining device, and allow for simple and quick insertion of the retaining device at an excellent retention force.

Some embodiments relate to a fiber-optic cable device comprising the retaining device described above, and a method for introducing a fiber-optic cable into the hollow part of the retaining device.

As indicated above, the fiber-optic cable may be introduced into the cavity of the retaining device before or after mounting the retaining device. As for mounting the retaining device, it is advisable that a mounting device be inserted into the groove, before insertion of the retaining element, and the mounting device be retracted following insertion of the retaining element. This is especially advantageous, if the retaining element has special means for interacting with one or more groove walls, e.g., geometric interlocking structures, adhesive, and/or hook surfaces. To reinforce the seat of the fiber-optic cable, the projection or the retaining element may be provided with a hook strip and pressed into the groove using the mounting device, as explained above. The retaining element with the hook strip is sufficiently rigid for it to slip fully into the groove as a result of the mounting force, without, e.g., bending or veering. The hook strip also catches the material of the groove. In some embodiments, the mounting device includes a bar, which is pushed into the groove during mounting and pulled out following insertion of the retaining device, in some embodiments, the strip has a width (dimension along the groove depth) in the range of 10-50 mm, and a thickness (dimension along the cross-section of the groove) in the range of 0.5-2 mm. In some embodiments, the width of the strip is about 20 mm and the thickness of the strip is about 1 mm. Prior to mounting, the mounting device is inserted into the groove and prevents the adhesive side and/or the hook strip from touching the opposite groove wall during mounting. The stable retaining element thereby slips into the groove without requiring a great effort. Upon mounting the fiber-optic cable, the mounting device is retracted. The length of the mounting device depends on the length of the groove. The fact that either or both sides of the retaining element may be adhesive and/or provided with a hook strip needs not be especially emphasized.

Besides simplifying the mounting process, as described, the mounting device may be instrumental in determining the depth of insertion, thereby ensuring defined positioning of the fiber-optic cable. In some embodiments, the insertion depth is determined by a slide moving on the mounting bar, whereby the mounting device is inserted downward a defined distance.

Some embodiments are intended to retain a fiber-optic cable on automotive interior elements. A groove for inserting the mounting device may include, for example, a joining area between interior parts or decorative surfaces. In some embodiments, the mounting device described here is used on interior door trims. However, the mounting device can also be used on the center console, the instrument panel, seat upholstery, or other elements of an automotive interior.

Although the disclosure is described based on its embodiments in an automobile, it may also be implemented within other fields, e.g., the wider field of transportation, such as aviation or navigation, furniture making, household equipment, etc. In addition, further advantages and features of the disclosed embodiments are apparent from the following description of embodiments. The features described here may be implemented separately or in combination with one or more of the aforesaid features, provided these features are not inconsistent with one another. The following description of the embodiments is made with reference to the accompanying drawings.

DESCRIPTION OF EMBODIMENTS

Figure 1:
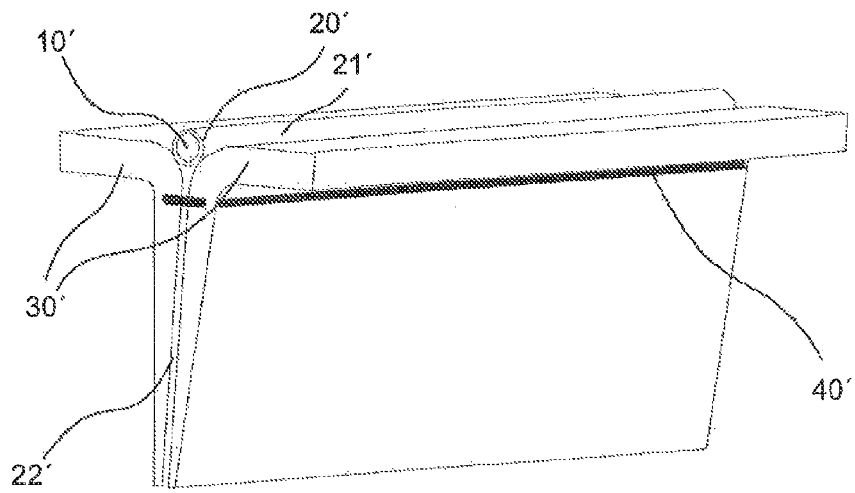
FIG. 1 shows a sewn fiber-optic cable over a retaining flag.
Figures 2A, 2B, 2C, 2D:
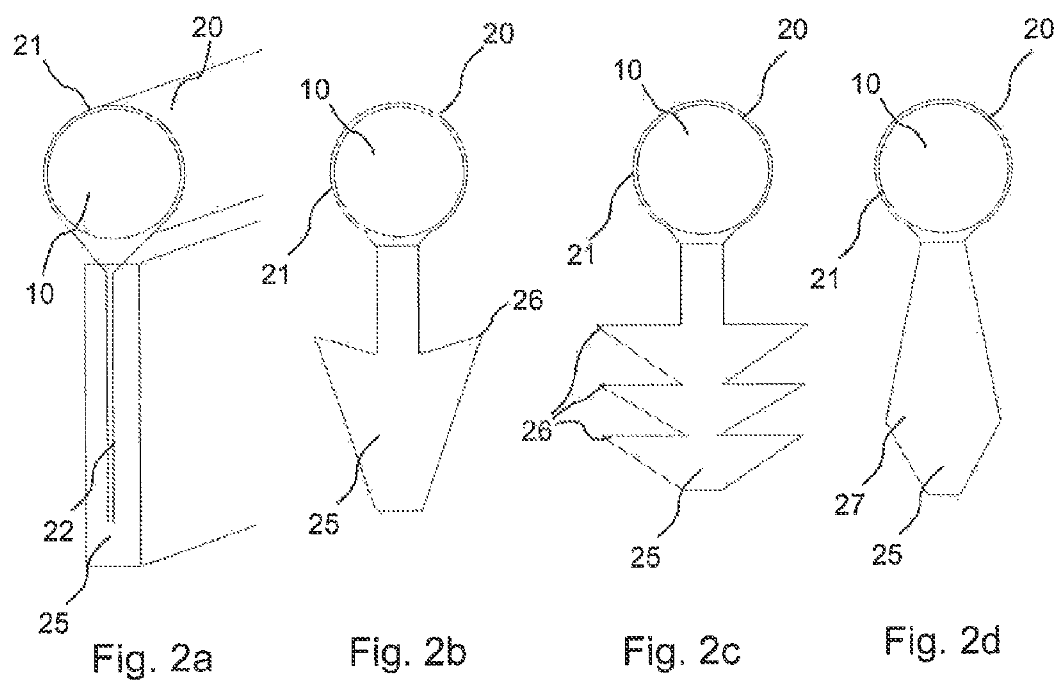
FIGS. 2*a*-2*d* show exemplary retaining devices comprising retaining elements of different geometries.

FIG. 2*a* shows a fiber-optic cable 10, which is covered by a fabric strip 20 acting as a receiving part. The fabric 20 has a hollow part 21, into which the fiber-optic cable 10 is inserted. At the lower surface of the fiber-optic cable 10, two ends of the fabric strip 20 are joined and together form a projection 22, also referred to as a flag. The projection 22 is embedded into a stable retaining element 25 made of plastic.

The retaining element 25 stiffens and/or reinforces the projection 22, such that the retaining device consisting of a receiving part 20 and a retaining element 25 may easily be inserted into an existing groove.

Alternatively, the fabric strip 20 may be replaced by a plastic cover, manufactured, e.g., in an extrusion process. The receiving part 20 made of plastic may be of one piece, whereby the required stability is obtained as a result of the thickness of the flag 22. Moreover, with the extrusion process, it is possible to manufacture different geometric interlocking structures in an especially simple way. Some examples of the interlocking structures are shown in FIGS. 2*b*-2*d*. In FIGS. 2*b*-2*d*, the hollow part 21 and the retaining element 25 are made of plastic as an integral part. However, it is obvious that in analogy to FIG. 2*a*, geometric interlocking structures may be made, including the projection 22 on the retaining element 25, or with a differently designed retaining element 25.

As in FIG. 2*a*, in each of FIGS. 2*b*-2*d*, a fiber-optic cable 10 is provided, which is fully covered by a receiving part 20, completely made of plastic in some embodiments. In the embodiments shown in FIGS. 2*b*-2*d*, the receiving part 20 has a hollow part 21 and a stable retaining element 25. The retaining elements 25 in FIGS. 2*b* and 2*d* exhibit different geometries. In FIGS. 2*b* and 2*c*, edges 26 shaped like barbed hooks are provided, which interlock and interact with groove walls such that secure retention of the fiber-optic cable 10 is ensured. The edges 26 may be sharp-edged or rounded off. The retaining element 25 of FIG. 2*d* exhibits a bulgy geometry expanding 27 in the lower area.

The geometric design of the retaining element may depend on the shape, especially the cross-section, the materials, and possibly other characteristics of the groove. Consistent with embodiments of the disclosure, the retaining element, with or without special geometric structures, has a firmness allowing for reliable insertion of the retaining device into the groove.

The retaining device according to the disclosure makes it possible to differentiate elegantly between standard and special automotive interior equipment. In some embodiments, the retaining device in the basic equipment (without a fiber-optic cable) differs from that of the special equipment (with a fiber-optic cable) only as regards the two drill holes allowing for passage of the two fiber-optic cable ends.

This is the case, for instance, with door trim with a groove lining. In a groove of the base support, two materials, which may be different or similar, converge (see FIGS. 3*a* and 3*b*), such that the fiber-optic cable with the reinforced retaining flag may be inserted at the resulting joint. This means that in order to insert the retaining device in the basic and special equipment, identical tools and procedures may be used, which in terms of manufacture translates into savings due to cost-efficiency and synergy. The groove width is measured so that a retaining device with a reinforced flag, i.e., a stable retaining element consistent with embodiments of the disclosure, may easily be mounted. In some embodiments, the retaining element has a thickness in the range of 0.5-2 mm, such as a thickness of about 1 mm, and a width in the range of 5-20 mm, such as a width of about 10 mm. In some embodiments, the flag of a fabric cover is glued with, for example, an ABS plastic strip and thus reinforced. After mounting the retaining device, the fiber-optic cable can be inserted from front to back through the hollow part and contact with light sources at the back.

Figure 3A:
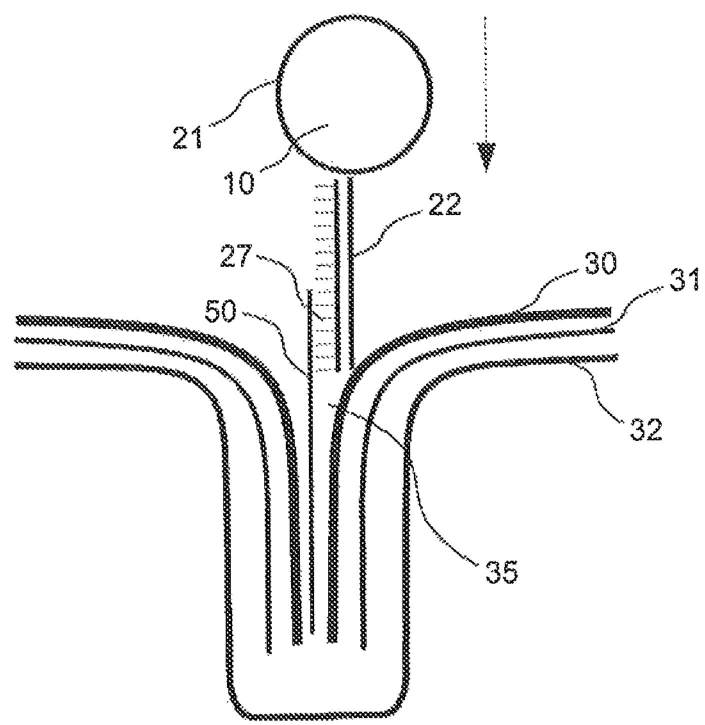
FIG. 3*a* shows a retaining device with a hook strip, which is inserted into a groove via a mounting device.
Figure 3B:
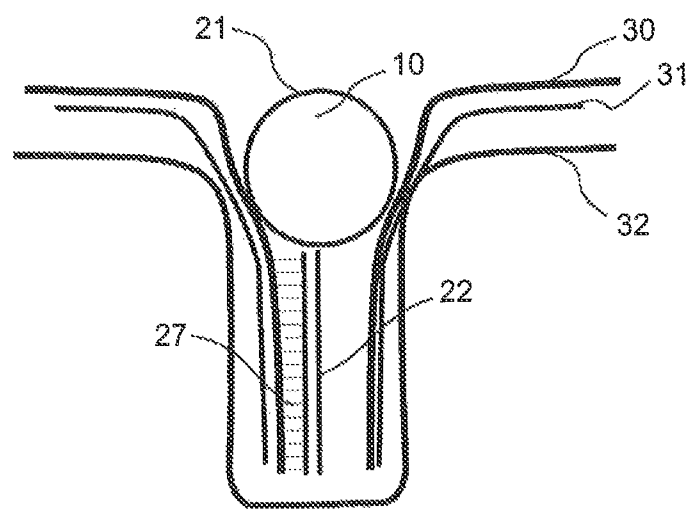
FIG. 3*b* shows the mounted retaining device of FIG. 3*a* following retraction of the mounting device.

FIG. 3*a* shows a fiber-optic cable 10 with a reinforced flag and/or reinforced projection 22. The flag 22 is reinforced with a hook strip 27. The hook strip 27 is sufficiently rigid for the reinforced flag 22 to slip completely into the groove 35 by a mounting force without bending or veering. The groove 35 is situated between two converging decorative surfaces 30, which may be provided, e.g., of leather, a leather-like material, and/or fabric. Below the decorative surface 30, a soft component 31 is provided. Below the soft component, a base support 32, which determines the shape of the groove, is provided. The fiber-optic cable 10 and the retaining device, including the hook strip 27 and the flag 22, are inserted into the groove 35, aided by a mounting device 50. In some embodiments, the mounting device 50 includes a bar of about 20 mm wide and 1 mm thick. During mounting, the mounting device 50 prevents the hook strip 27 from contacting the material of the decorative layer 30. Moreover, the flag 22 slips into the groove 35 without the need for much effort. Following mounting, the mounting device 50 is retracted. The length of the mounting device 50, designed as bar, depends on the length of the groove 35, whereby a one-to-one correspondence need not necessarily apply. Besides simplifying the mounting, the mounting device 50 may determine the insertion depth, thereby ensuring defined positioning of the fiber-optic cable 10. The insertion depth may be determined by using a slide (not shown), which moves on the mounting device 50 and thus presses the fiber-optic cable 10 downward for a defined distance.

The invention claimed is:

1. A retaining device for retaining a fiber-optic cable, the retaining device comprising:

a receiving part made of a fabric and including:

an elongated hollow part configured to receive the fiber-optic cable; and a projection extending away from the hollow part, when viewed in a cross-section, wherein the elongated hollow part and the projection are integral components of the receiving part; and a retaining element extending away from the hollow part, when viewed in the cross-section, the retaining element:

including a plastic strip, being connected with the projection, and being configured to be inserted into a groove.

2. The retaining device according to claim 1, wherein the retaining element includes a geometric structure configured to interlock with the groove.

3. The retaining device according to claim 1, wherein the retaining element has an adhesive side.

4. The retaining device according to claim 1, wherein the retaining element has a hook strip.

5. The retaining device according to claim 1, wherein a thickness of the retaining element is in a range of 0.5-2 mm.

6. The retaining device according to claim 5, wherein the thickness of the retaining element is about 1 mm.

7. The retaining device according to claim 1, wherein a width of the retaining element is in a range of 5-20 mm.

8. The retaining device according to claim 7, wherein the width of the retaining element is about 10 mm.

9. A fiber-optic cable device comprising:

a retaining device according to claim 1; and a fiber-optic cable inserted in the hollow part.

10. A method for mounting a fiber-optic cable, comprising:

preparing a retaining device according to claim 1;

inserting the retaining element into the groove; and inserting the fiber-optic cable into the retaining device.

11. The method according to claim 10, wherein inserting the fiber-optic cable into the retaining device includes inserting the fiber-optic cable into the retaining device before or after inserting the retaining element into the groove.

12. The method according to claim 10, further comprising:

inserting a mounting device into the groove before inserting the retaining element into the groove; and retracting the mounting device after inserting the retaining element.

13. The method according to claim 12, wherein inserting the retaining device includes inserting a bar having a width a width of about 20 mm and a thickness of about 1 mm.

14. The method according to claim 12, wherein:

the retaining element has an adhesive side or a hook side, and inserting the retaining element includes inserting the retaining element while preventing the adhesive side or the hook side from contacting a side of the groove by using of the mounting device.

* * * * *